United States Patent [19]
Williams

[11] 3,936,088
[45] Feb. 3, 1976

[54] FLEXIBLE TARPAULIN HANDLING DEVICE

[76] Inventor: Charles Samuel Williams, 4013 - 49th St., Lubbock, Tex. 79413

[22] Filed: July 1, 1974

[21] Appl. No.: 484,893

[52] U.S. Cl............... 294/19 R; 294/24; 294/26
[51] Int. Cl.² ............................ A47F 13/06
[58] Field of Search .......... 294/2, 10, 19 R, 22, 24, 294/26, 23, 66 R; 7/12, 14.3; 49/461; 114/221 R, 230; 254/131, 133 R, 134.3 R, 134.3 PA

[56] References Cited
UNITED STATES PATENTS

| | | | |
|---|---|---|---|
| 78,844 | 6/1868 | Tobey.................................. | 49/461 |
| 457,219 | 8/1891 | Sanford............................... | 294/19 R |
| 693,200 | 2/1902 | Wilkin ................................. | 294/23 |
| 824,968 | 7/1906 | Wright................................. | 294/19 R |
| 981,857 | 1/1971 | Hubbard et al............... | 294/19 R X |
| 1,045,679 | 11/1912 | Cronin ........................... | 294/19 R X |
| 1,217,680 | 2/1917 | Bagby................................. | 294/24 |
| 1,512,315 | 10/1924 | Sandford.............................. | 294/24 |
| 2,291,593 | 7/1942 | Hubbard ........................... | 294/19 R |

Primary Examiner—Evon C. Blunk
Assistant Examiner—Johnny D. Cherry
Attorney, Agent, or Firm—Pollock, Vande Sande & Priddy

[57] ABSTRACT

A flexible tarpaulin handling device is disclosed for the remote handling of tarpaulins arranged over the top of a truck or other vehicle. A tarp hook is securely attached to an elongated handle. The tarp hook defines an upwardly extending downwardly curving hook portion for pulling the tarpaulin downwardly, and a downwardly extending upwardly curved hook portion for raising the tarpaulin. Either hook may be used for laterally shifting the tarpaulin. The hook portions are laterally opposed to one another and are mounted to a central interconnecting portion which is in turn securely mounted to a bifurcated tang. The bifurcated tang is riveted on the elongated handle. The truck operator is thereby able to shift the tarpaulin to align it with the appropriate securing means while standing on the ground.

4 Claims, 4 Drawing Figures

U.S. Patent  February 3, 1976  3,936,088
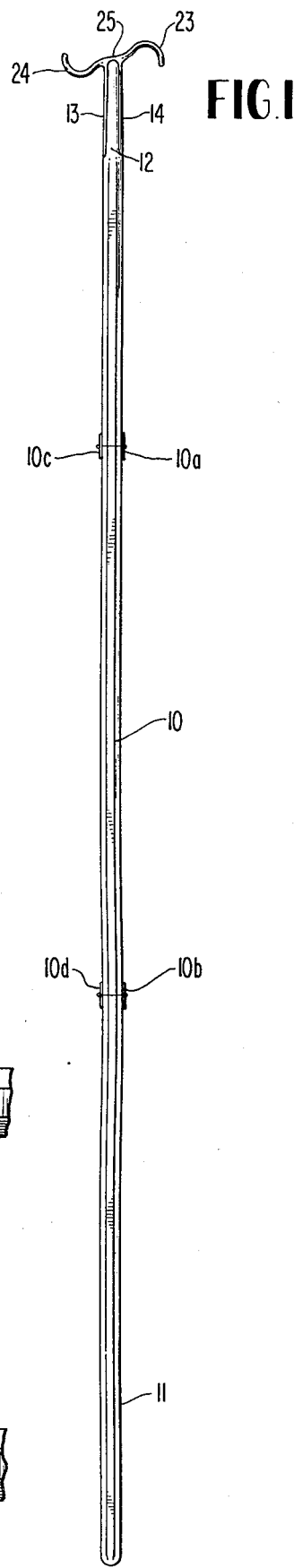
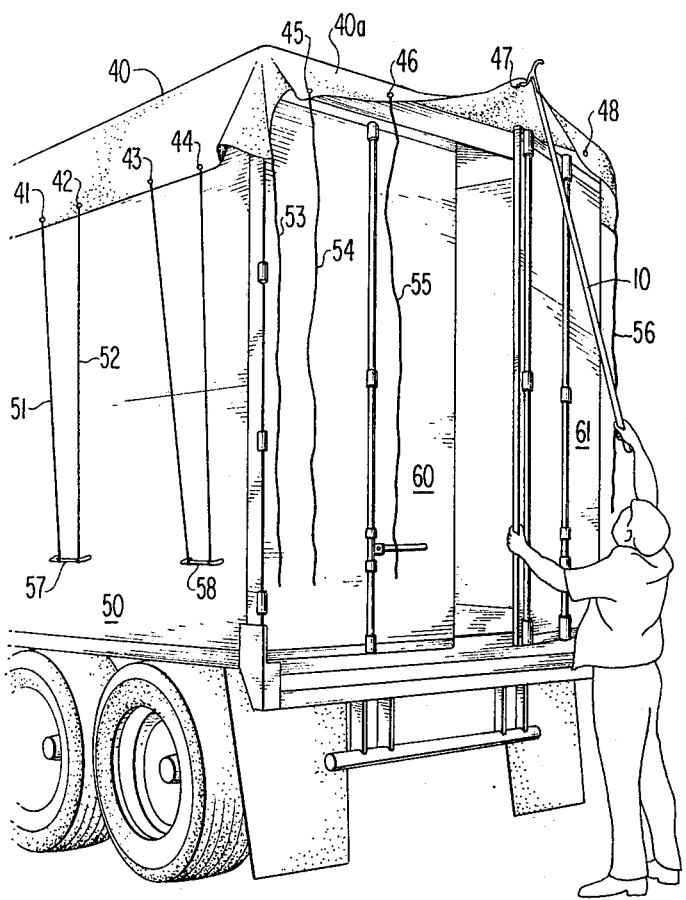
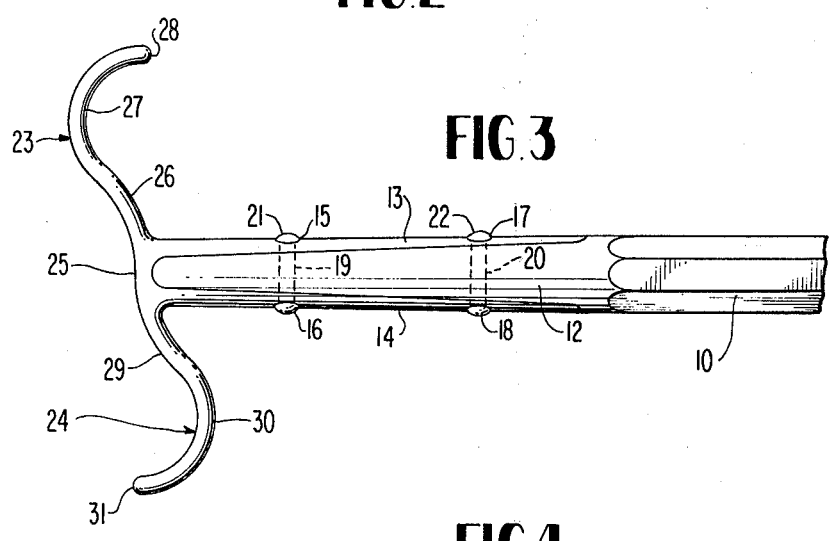
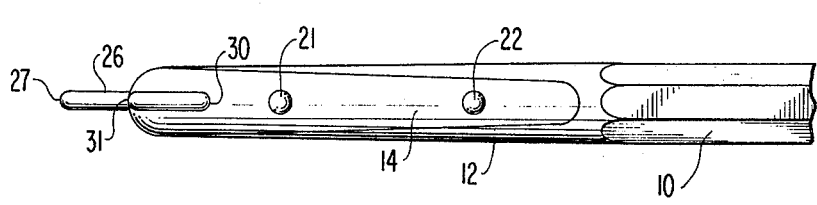

FLEXIBLE TARPAULIN HANDLING DEVICE

SUMMARY OF THE INVENTION

The present invention relates to a tarpaulin hook for the remote handling of a tarpaulin arranged over the top of a truck or tractor/trailer unit. The tarpaulins disposed over the tops of these vehicles are frequently 10 to 12 feet above the ground, and the arrangement of the tarpaulin and securing it to the trailer can be hazardous if the operator is forced to climb on the side of the truck. If ladders or separate scaffolding is used for arranging the tarpaulin, the operation becomes time-consuming and expensive.

In the prior art, when a truck covered with a tarpaulin is unloaded, the truck must first be backed to the unloading dock, and the operator undoes the tarpaulin and moves it over the rear doors of the vehicle. After this operation is completed, the truck must then be moved out so that the rear doors may be opened, and then backed again into the loading dock area.

The present invention eliminates the necessity for backing into the dock twice. With the remote tarpaulin handling device, the operator may remove the tarpaulin from over the doors and roll it back over the rear portion of the vehicle so that the doors may be opened before the truck is backed into the loading dock.

The present invention also assists the operator in initially arranging the tarpaulin whereby the tarpaulin is unrolled or unfurled from the forward portion of the vehicle to the rear portion. The operator is able to stand on the ground and manipulate the implement to move the tarpaulin into position.

The present invention is equipped with a double ended hook member mounted on an extension handle. The hook member has a first upwardly extending downwardly curving hook portion, and a laterally opposed downwardly extending upwardly curving hook portion. These two hooks are formed with a central interconnecting member which is in turn welded or otherwise mounted on a bifurcated tang. The bifurcated tang is securely attached to an extension handle by rivets or other means. The first upwardly extending downwardly curving hook portion is used for pulling the tarpaulin down into place, while the downwardly extending upwardly curving hook portion is used for lifting or removing the tarpaulin. Both hooks are useful in the lateral adjustment of the tarpaulin along the side of the trailer.

It is another object of the present invention to provide a remote tarpaulin handling device which will engage eyelets or grommets formed in the sides of the tarpaulin and thereby move the tarpaulin into position from a remote location. The present invention is also intended to provide a remote tarpaulin handling device which is simple in design, inexpensive to manufacture, rugged in construction, easy to use and efficient in operation.

BRIEF DESCRIPTION OF THE DRAWINGS

FIG. 1 is a side view of the present invention illustrating the flexible tarpaulin handling device and its extension handle.

FIG. 2 is an isometric drawing illustrating the manner in which the present invention is used.

FIG. 3 is a side view of the present invention illustrating the upwardly extending downwardly curving hook portion and the downwardly extending upwardly curving hook portion.

FIG. 4 is a side view of the present invention as illustrated in FIG. 3 with the handle turned approximately 90°.

DETAILED DESCRIPTION OF THE PREFERRED embodiment

As illustrated in FIG. 1, the remote flexible tarpaulin handling device is equipped with an elongated handle portion 10 which has a grasping portion 11 formed at one end thereof. This grasping portion as illustrated in FIG. 1 is equipped with a polygonal cross section, but may also be knurled or otherwise roughened to assist the operator of a motor vehicle in securely and firmly grasping the device. In the preferred embodiment, it is shaped with an octagonal cross section. The extension handle 10 also defines at an opposite end a tang portion 12 which is adapted to cooperate with a bifurcated tang portion formed on the tarpaulin handling device. In the preferred embodiment of the invention, the handle device 10 is formed of wood, but it would also be possible to form the extension of tubular aluminum or plastic, providing the structure is light in weight and sufficiently strong to prevent collapse in operation.

In the preferred embodiment of the invention, extension handle 10 is approximately 8 feet long. This enables the operator to reach to the top of a truck or tractor/trailer unit easily and conveniently. The 8-foot pole may be carried on the exterior of the "yard tractor" found in most large truck terminals. A short length of pipe, two to three feet long, with an end cap provides a convenient holder for the device.

Alternately, the handle member 10 may be hinged, as indicated at 10a and 10b, to allow the operator of the truck or tractor/trailer to carry the tarp hook with him inside the cab. Lock means 10c and 10d secure the handle in its extended position after it has been unfolded. Alternately, if the handle is made of tubular aluminum, the handle could be formed of telescoping tubing with friction locks in place of hinges 10a and 10b.

As illustrated in FIGS. 3 and 4, the handling device is equipped with a bifurcated tang portion having first 13 and second 14 downwardly extending tangs which are secured to the handle member 10. In the preferred embodiment of the invention, the tang defines a first 15–16 and second 17–18 set of openings which correspond with the first 19 and second 20 openings defined by the handle member. The tang is securely fastened to the handle by first 21 and second 22 rivets which extend through the respective first and second openings to secure said tang to said handle. Alternately, bolts or pegs could be used in securing the tang to the handle.

The device is also equipped with a double ended hook member mounted on said bifurcated tang. The hook member defines a first upwardly extending downwardly curving hook portion 23 and a laterally opposed downwardly extending upwardly curving hook portion 24 which are attached to a central interconnecting portion 25. The first hook defines three separate portions, a first upwardly extending portion 26, a downwardly curving hook portion 27 which extends through at least 90° of arc to end in a downwardly extending terminal portion 28. This upwardly extending hook is particularly adapted to engage an eyelet or other opening defined by a flexible tarpaulin to thereby assist the operator of the device in pulling the tarpaulin in a downward direction, or for laterally shifting the tarpaulin after the hook member has been engaged.

The laterally opposed hook member is equipped with a downwardly extending portion 29 and an upwardly curving hook 30 which extends through at least 90° of arc to end in an upwardly extending terminal portion 31.

In the preferred embodiment of the invention, the double ended hook member is formed from a steel rod which is welded to the tang member along the interconnecting portion 25. Alternately, the entire assembly could be forged into a single piece of metallic structure.

OPERATION

The operation of the present invention is illustrated in FIG. 2. It is common practice in unloading trucks equipped with a flexible tarpaulin to back the trailer or truck body into the loading dock, and then climb to the top of the loading dock to undo tarpaulin which covers the truck. After the tarpaulin has been undone and lifted over the doors, the truck is then pulled away from the loading dock to open the doors, and then backed into the loading dock space.

The present invention makes this first "docking" unnecessary. The operator merely stands on the ground as illustrated in FIG. 2 and is able to engage the flexible tarpaulin 40 with the tarp hook as illustrated in FIG. 2. The tarpaulin 40 is normally equipped with a plurality of grommets or eyelets 41–48 which are arranged around the outer periphery of the tarpaulin. It is customary to secure the tarpaulin to the truck body 50 by means of a plurality of flexible lines indicated at 51–56 which are in turn secured to tie bars 57–58 arranged around the outer periphery of the vehicle. Since the tarpaulin is disposed some 10 to 12 feet about the ground, it is not possible to maneuver the tarpaulin by hand without a ladder or other scaffolding. Since moving a ladder is extremely time-consuming, the operator will often attempt to maneuver the tarpaulin from the side of the vehicle by standing on the tie bars 57–58. This presents a definite safety hazard to the operator since the exterior surface of most vans or trucks is extremely smooth, and does not afford provisions for the safe traversing of the side of the vehicle. With the present invention, however, the operator is able to maneuver the tarpaulin from the ground as illustrated in FIG. 2. As illustrated in FIG. 2, the operator could be either completing the loading of the trailer, or beginning the unloading. In the final loading of the vehicle, the exterior edge of the tarpaulin 40a must be lifted while the doors 60 and 61 are closed. After the doors are closed and locked in place the rearward portion 40a of the tarpaulin is then lowered over the back of the vehicle and secured by means of tie-lines 51–56.

In unloading the vehicle, the tie-lines 51–56 are disengaged, and the terminal portion of the tarpaulin 40a is lifted upwardly over the doors as previously described with respect to FIG. 2 so that the doors 60 and 61 may be opened, before the truck is backed into the loading dock.

The remote tarpaulin handling device may also be used to arrange the tarpaulin 40 after the truck is loaded. In many trucks, the tarpaulin is stored at the forward portion of the vehicle, and after the vehicle is loaded it is unrolled rearwardly to cover the top of the vehicle. The tarp hook will assist the operator in unrolling the tarpaulin. As illustrated in FIGS. 3 and 4, each of the tarp hooks is equipped with a hook for pulling downwardly, and a hook for lifting upwardly. The terminal ends 28 and 31 engage the grommets or eyelets 41–48 thereby assisting in moving the tarpaulin. Each of the curving portions 27 and 30 curves through approximately 120° of arc as illustrated in FIGS. 3 and 4. If the arc is too great, the operator will have trouble freeing the hook after the tarpaulin has been pulled into place, while if the arc is too small, the tarpaulin will slip from the hook when pressure is applied to move the tarpaulin. The configuration illustrated in FIGS. 3 and 4 enables the operator to firmly engage the tarpaulin, while allowing for easy disengagement.

While the foregoing description has set forth the preferred embodiment of the invention, various modifications may become apparent to those skilled in the art to which this invention relates. Accordingly, all such modifications are included within the intended scope of the present invention as recited in the following claims.

I claim:

1. A flexible tarpaulin handling device for maneuvering tarpaulins equipped with grommets or eyelets, said device comprising the combination of:
   a. An elongated handle member, said handle having a grasping portion at one end thereof, said portion having a polygonal cross section to assist in positively gripping the device, said handle member also defining a shank portion on the opposite end of said handle, said shank portion being adapted to receive a bifurcated tang portion of a tarp hook,
   b. A tarp hook having a bifurcated tang portion adapted to cooperate with said handle portion in securing said hook to said handle and
   c. A double ended integrally formed tarp hook member mounted on said bifurcated tang portion, said member having a first upwardly extending downwardly curving hook portion, a laterally opposed downwardly extending upwardly curving hook portion and a central interconnecting portion, said first upwardly extending hook portion defining a hook which first extends upwardly from said interconnecting portion and then curves downwardly through at least 90 degrees of arc to end in a downwardly extending terminal portion, said upwardly extending hook being adapted to engage an eyelet or other opening defined by said flexible tarpaulin to thereby hook said tarpaulin for pulling in a downward direction; said laterally opposed downwardly extending portion extending downwardly from said interconnecting portion and then curving upwardly through at least 90 degrees of arc to end in an upwardly extending terminal portion, each of said hook portions defining substantially the same radius of curvature, said interconnecting portion being fixably attached to said bifurcated tang portion.

2. A tarp hook device as claimed in claim 1 wherein said polygonal cross section defines an octagon along substantially the entire length of the handle.

3. A tarp hook device as claimed in claim 1 wherein said tang defines a first and second set of openings which correspond with first and second openings defined by said handle member, said tang being securely attached to said handle by first and second rivets which extend through their respective first and second openings.

4. A tarp hook device as claimed in claim 1 wherein said elongated handle is formed of a plurality of sections which may be extended and locked in place.

* * * * *